3,702,342
FUMARIC ACID CRYSTALLIZATION PROCESS
Gene M. Kibler, Terre Haute, Ind., and Clifton L. Singleton, Brown Deer, Wis., assignors to Pfizer Inc., New York, N.Y.
No Drawing. Filed July 2, 1971, Ser. No. 159,484
Int. Cl. C07c 51/42
U.S. Cl. 260—537 N                      2 Claims

ABSTRACT OF THE DISCLOSURE

In a process for preparation of fumaric acid crystals by the catalytic isomerization of maleic acid solution, slow agitation during isomerization and then simultaneously slow cooling at a rate of about 0.25–6.2° C. per minute after isomerization is substantially complete, results in fumaric acid crystals having a relatively low content of fine materials.

BACKGROUND OF THE INVENTION

The production of fumaric acid by the isomerization of aqueous maleic acid solution is well known. The catalyst system usually employed is a combination of a bromine-providing compound and a strong oxidizing agent (e.g. ammonium bromide and ammonium persulfate).

However, one of the problems with prior art isomerization processes is that the fumaric acid crystals obtained are of a small size and contain an appreciable quantity of fines, or crystalline particles of extremely small size. It is of course advantageous and particularly important to obtain fumaric acid crystals of large average size and low fines content to prevent problems such as caking and powdering during storage and handling; to prevent dust problems; and to promote consumer acceptance.

SUMMARY OF THE INVENTION

The present invention overcomes these problems by producing fumaric acid crystals having a substantially larger average size and a substantially reduced fines content.

In the preparation of fumaric acid crystals by the catalytic isomerization at elevated temperatures of aqueous maleic acid solution containing about 10 to 70% by weight of maleic acid, the improvement comprises:

(a) Slowly agitating the solution during isomerization at a rate just sufficient to keep any fumaric acid particles that form during the isomerization in suspension in the solution;

(b) After the isomerization is substantially complete, and while maintaining the solution under said conditions of slow agitation, simultaneously cooling the solution containing the fumaric particles in suspension at a rate of about 0.25–6.2° C. per minute until the solution is at room temperature; and (c) Recovering said fumaric acid crystals. Preferably the cooling rate is about 0.5–1.5° C. per minute.

DETAILED DESCRIPTION OF THE INVENTION

The preparation of fumaric acid via a combination of reactions starting with benzene as the raw material is well known. Typically benzene is oxidized by contacting a benzene-air gas mixture at about 10–20 p.s.i.g. and 700° F. with a catalyst such as vanadia and/or molybdena to form maleic anhydride, which is then absorbed in water to form maleic acid. Other methods well known in the art for making maleic anhydride and maleic acid can be used to provide the maleic acid utilized herein. The aqueous maleic acid solution is filtered to remove impurities, clarified by carbon treatment, and then isomerized to fumaric acid by heating in the presence of air and a catalyst. Fumaric acid is almost insoluble in water and is removed by vacuum flash cooling to ambient temperature and then centrifugation and drying.

Typically the aqueous maleic acid solution to be isomerized may contain from about 10–70% by weight of maleic acid; generally it contains about 20–50% and preferably about 25–40% of maleic acid. At concentrations over about 40% maleic acid, difficulty is encountered in keeping the slurry in suspensions during isomerization.

The catalyst system generally used is a combination of a soluble bromine-providing compound and a strong oxidizing agent, preferably ammonium bromide and ammonium persulfate, respectively. Of course, other isomerization catalysts can be used, which are not limited to but include thiazole, thiourea, mercaptans, heavy metal salts, and many others. Typical bromine-providing compounds and oxidizing agents as well as concentrations are disclosed in U.S. 3,361,809 (columns 2 and 3).

Usually the catalyst system is added simultaneously with the aqueous maleic acid solution to the reactor in which a small portion of the maleic acid charge has been heated to the isomerization reaction temperature (generally about 55–75° C. and preferably about 60–70° C.) to begin the isomerization. The isomerization to fumaric acid can take from about 1–60 minutes depending on the particular reaction conditions.

The prior art teaches vigorous agitation of the isomerization solution during reaction and flash vacuum cooling after the isomerization is substantially complete to obtain the fumaric acid crystals, which are then removed by centrifugation or filtering, washed, and dried. However, the crystalline product obtained contains a substantial fines content (less than 325 mesh) and a large proportion of small size crystalline particles.

The present invention provides a process for obtaining substantially pure fumaric acid crystals having negligible fines content and having a large average crystalline size. Contrary to the teachings of the prior art, large size fumaric acid crystals are obtained by slowly agitating the isomerization solution during conversion to fumaric acid at a rate just sufficient to keep any fumaric acid crystalline particles that form during the isomerization in suspension in the solution. Since fumaric acid is highly insoluble in water, some of the fumaric acid that forms during isomerization will usually begin precipitating out during the reaction. The isomerization mixture is agitated at a rate fast enough to prevent the particles from settling out and forming a cake at the bottom of the reaction vessel, and yet slow enough so as to minimize the physical deterioration of the particles due to collision of particles with each other and with equipment. Typically in plant scale reaction vessels (e.g. 4000 gallons capacity) the slow agitation is accomplished with a mechanical stirrer operating at about 40–70 r.p.m., whereas in a laboratory vessel (e.g. 2 liter capacity) the stirrer is operated at about 20–40 r.p.m.

Once the isomerization reaction is substantially complete (usually 15–45 minutes and conveniently determined when a sample of the reaction mixture can be cooled, filtered and the resultant mother liquor assays less than about 1.5 weight percent maleic acid as measured by titration with a standard sodium hydroxide solution) the isomerizaiton mixture is slowly cooled, while simultaneously maintaining mild agitation, until the mixture is at room temperature (e.g. about 25° C.). The cooling rate can be about 0.25–6.2° C. per minute and is preferably about 0.5–1.5° C. per minute. This combination of slow cooling and mild agitation allows for the formation of fumaric acid crystals having a large average size and a small fines content. At cooling rates much below about 0.25° C. per minute, the process is very time consuming; whereas at rates much above 6.2° C. per minute, crystallization is too rapid, not allowing sufficient time for large crystals to form and resulting in a larger fines content. Furthermore, if the rate of agitation of the mixture is too rapid during crystal formation, again the crystalline particles formed are smaller in size with a larger fines content. Thus it is also contemplated within the scope of the invention to vary the rate of agitation and/or the rate of cooling during the isomerization reaction to arrive at optimum conditions for obtaining the desired crystal size of product.

The controlled cooling can be accomplished by any suitable means known to those skilled in the art. Preferably it is accomplished by vacuum cooling.

Recovery of the fumaric acid crystals is preferably by filtration or centrifugation, washing, and drying. However, other means can be employed by anyone skilled in the art.

The invention herein disclosed is applicable to essentially all aqueous solutions of maleic acid which may be subjected to isomerization to form fumaric acid. Conventionally, the maleic acid is formed by the oxidation of benzene; however, the invention is not limited to this particular synthesis selected for illustrative purposes here (for example, maleic acid may be derived from 2-butene).

Also, while the invention herein disclosed is illustrated in the form of a batch process, it may be conducted in a continuous basis as well.

The following examples are provided for illustrative purposes and should not be interpreted as limiting the invention, the scope of which is defined by the appended claims.

EXAMPLE I 243 ml. of an aqueous maleic acid solution containing 35.8% by weight of maleic acid is heated in a flask to 66° C. Then 1.6 ml. of a 20% $NH_4Br$ solution (representing 0.32 weight percent of $NH_4Br$ based on the maleic acid content of the solution) and 5.1 ml. of a 34% $NH_4S_2O_8$ solution (representing 1.7 weight percent of $NH_4S_2O_8$ based on the maleic acid content of the solution) is added to the solution in the flask and the resulting solution is maintained at a temperature of 65–67° C. under vigorous agitation by a mechanical stirrer oeprating at about 70 r.p.m. The isomerization reaction began to take place approximately 8 minutes thereafter. Heating and vigorous agitation by a mechanical stirrer operating at about 70 Then by applying vacuum cooling it was possible to cool the mixture at a vacuum of 35 mm Hg. to 45° C. in about 3 minutes (cooling rate of about 7.0° C./minute). Increased vacuum to 22–25 mm. Hg. was applied and cooling continued to 27° C. in about 3 additional minutes. After holding vacuum constant for another 5 minutes and then releasing vacuum, crystals of fumaric acid were recovered by filtering, washing, and drying.

EXAMPLE II

The same procedure of Example I was followed except that the solution was cooled to 30° C. in about 3 minutes by applying a vacuum of 30 mm. Hg. (represents cooling rate of 10° C./minute). Vacuum was increased to 22 mm. Hg. and solution temperature decreased to 26° C. in 1 additional minute (represents cooling rate of 4° C./minute).

EXAMPLE III

The same procedure of Example I was followed except that the mechanical stirrer operated at about 35 r.p.m. (slow rate of agitation) and the solution was vacuum cooled to 35° C. with 60 mm. Hg. vacuum in about 5 minutes (representing cooling rate of 6.2° C./minute) and then down to 27.5° C. in another 10 minutes by increasing the vacuum to 28 mm. Hg. (representing cooling rate of 0.75° C./minute).

EXAMPLE IV

The same procedure of Example III was followed except that vacuum cooling after the isomerization was substantially complete was accomplished as indicated below:

| Cooling time | Vacuum, mm. Hg | Solution temperature, °C. | Cooling rate, °C. minute |
|---|---|---|---|
| Minutes: | | | |
| 0 | 760 | 66 | |
| 15 | 104 | 49 | 1.13 |
| 20 | 65 | 44 | 1.0 |
| 25 | 48 | 37 | 1.4 |
| 30 | 33 | 31.5 | 1.1 |
| 35 | 21 | 25 | 1.3 |

EXAMPLE V

The distribution of particle sizes (in terms of weight percent of product retained at each mesh size) for the crystalline fumaric acid products obtained in Examples I–IV is:

| | Mesh size of— | | | | |
|---|---|---|---|---|---|
| Product from— | 30 | 50 | 100 | 325 | Fines (smaller than 325) |
| Example: | | | | | |
| I | 0 | 0 | 35.10 | 62.10 | 0.28 |
| II | 0 | 0 | 77.82 | 20.52 | 0.28 |
| III | 0.2 | 18.48 | 67.52 | 11.84 | 0 |
| IV | 0 | 14.88 | 79.2 | 3.84 | 0 |

EXAMPLE VI

The procedure of Example III is followed, except that an equivalent amount of maleic acid is used in the form of an aqueous maleic acid solution containing 10 weight percent of maleic acid and similar results are obtained.

EXAMPLE VII

The procedure of Example III is followed, except that an equivalent amount of maleic acid is used in the form of an aqueous maleic acid solution containing 70 weight percent of maleic acid and similar results are obtained.

EXAMPLE VIII

The procedure of Example III is used except that after the solution is vacuum cooled to 35° C., a cooling rate 0.5° C./minute is used to cool the solution to 27.5° C.

What is claimed is:

1. In a process for the preparation of fumaric acid crystals by the catalytic isomerization at elevated temperature of aqueous maleic acid solution containing about 10 to 70% by weight of maleic acid, the improvement which comprises:
   (a) slowly agitating the solution during isomerization at a rate just sufficient to keep any fumaric acid particles that form during the isomerization in suspension in the solution;
   (b) after the isomerization is substantially complete, and while maintaining the solution under said conditions of slow agitation, simultaneously cooling the solution containing the fumaric particles in suspension at a rate of about 0.25–6.2° C. per minute until the solution is at about 25° C.; and
   (c) recovering said fumaric acid crystals.

2. The process of claim 1 wherein the cooling rate is about 0.5–1.5° C. per minute.

References Cited

UNITED STATES PATENTS

| | | | |
|---|---|---|---|
| 3,219,693 | 11/1965 | Becker | 260—537 N |
| 3,332,992 | 7/1967 | Brown et al. | 260—537 N |
| 3,361,809 | 1/1968 | Saffer et al. | 260—537 N |

VIVIAN GARNER, Primary Examiner

U.S. Cl. X.R.

260—346.8, 533 N